UNITED STATES PATENT OFFICE.

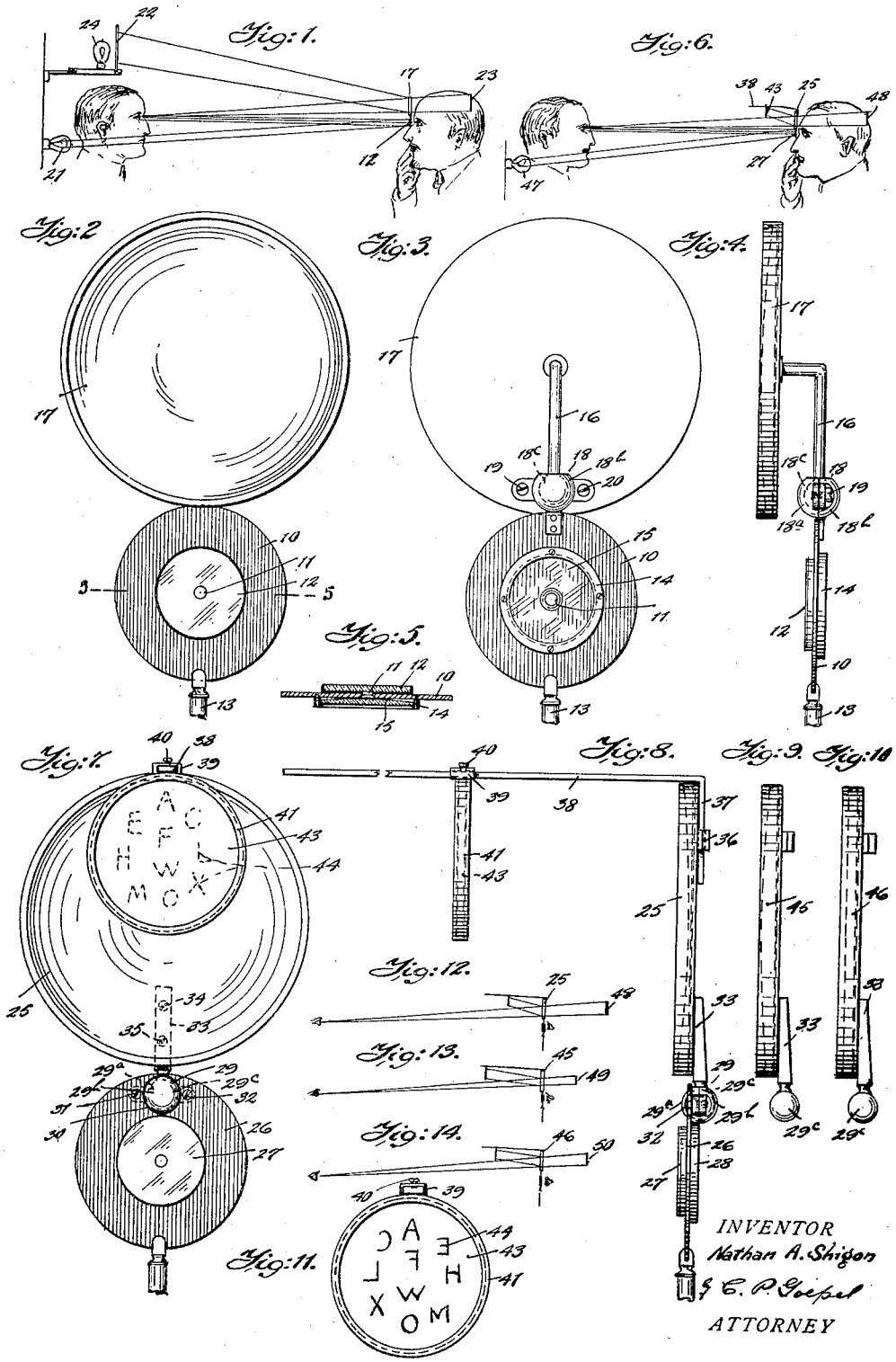

NATHAN A. SHIGON, OF NEW YORK, N. Y.

SKIASCOPE.

1,351,220.  Specification of Letters Patent.  Patented Aug. 31, 1920.

Application filed February 1, 1919. Serial No. 274,410.

*To all whom it may concern:*

Be it known that I, NATHAN A. SHIGON, a citizen of the United States, and a resident of the borough of the Bronx, county of the Bronx, city and State of New York, have invented certain new and useful Improvements in Skiascopes, of which the following is a specification.

The present invention relates to improvements in skiascopes and has for an object to provide an instrument of this character with which skiascopic tests for hypermetropia or other refractive errors of the eyes may be carried out in a more efficient and convenient manner than has heretofore been possible, and with a greater degree of certainty. This application is a continuation in part of my United States patent application for skiascopes, Serial No. 263,807, filed November 23, 1918, allowed January 14, 1919.

With the above and other objects in view, embodiments of my invention are shown in the accompanying drawings and these embodiments will be hereinafter more fully described with reference thereto and the invention will be finally pointed out in the claims.

In the accompanying drawings:

Figure 1 is a view showing the patient and the examiner, and the manner of using one embodiment of my improved skiascope;

Fig. 2 is a front view of the instrument;

Fig. 3 is a rear view thereof;

Fig. 4 is an edge view;

Fig. 5 is a horizontal sectional view taken along the line 5—5 of Fig. 2;

Fig. 6 is a view showing the patient and the examiner and the manner of using a modified form of my improved skiascope;

Fig. 7 is a front view of this modified form of instrument;

Fig. 8 is an edge view thereof and showing a concave reflecting mirror;

Fig. 9 is an edge view of a convex reflecting mirror adapted for use in connection with the embodiment shown in Figs. 7 and 8;

Fig. 10 is a similar view of a plane reflecting mirror;

Fig. 11 is a front view of a type of chart used in connection with the instrument shown in Figs. 7 and 8;

Fig. 12 is a view showing the patient and the examiner and the manner of using this type of instrument, and in which the concave mirror is used;

Fig. 13 is a similar view in which a convex mirror is used; and

Fig. 14 is a similar view in which a plane mirror is used.

Similar reference characters indicate corresponding parts throughout the several figures of the drawings.

Referring to the drawings, and more particularly to Figs. 2 to 5 thereof, this embodiment of my improved skiascope comprises a disk 10 having a central peep hole 11 and provided with a small circular mirror 12, having its periphery concentric to the peep hole, the portion of the mirror overlying the peep hole being clear so that light may be transmitted through it into the examiner's eye. A handle 13 is provided for holding the skiascope and manipulating the same as shown in Fig. 1. At the rear side of the disk 10 there is secured by means of a retaining ring 14, a corrective lens 15 which is suited to the particular examiner's eye. This enables the examiner, should he have defective eyesight, to use the instrument without his glasses which would be of considerable annoyance especially when the examiner is presbyopic, and needs a correction for near vision.

Above or at the side of the skiascopic mirror 12 there is supported upon an arm 16 a spherical reflecting mirror 17, the mirror shown in this particular embodiment being convex. The connection between the disk 10 and the arm 16 is adjustable by means of a ball and socket joint 18, the socket being formed of two portions 18ª and 18ᵇ adapted to be tightly clamped over the ball 18ᶜ, provided at the end of the arm by means of screws 19 and 20 to fix the position of the mirror. This arrangement enables the mirror to be fixed at any desired angle depending upon the arrangement of the light in the room where the examiner views the patient's eyes.

The test with this embodiment is conducted in the following manner in a darkened room:

A lamp 21 is placed behind the patient who is at one end of the room, or the lamp may be at his side, or it may if desired be attached to the mirror 12, the rays of the light from the lamp being reflected from the small mirror 12 held by the examiner upon the pupil, and illuminating the retina of the patient's eye, and by tilting the skiascope the rays are reflected first into one eye and then into the other. There will be some instances where only one half of the patient's pupil will be illuminated and the other half will be in shadow, and if the patient's eyes are in error a reflex and a shadow will be seen.

Above or at the side of the patient there is provided a chart 22 of any suitable type such for instance as that shown in Fig. 11 although it will be understood that charts having lines or dots may be substituted therefor. The image of the chart 22 is reflected from the spherical mirror 17 and it is the virtual image 23 of the chart at which the patient directs his gaze. The chart 22 may be transparent, that is, it may be constructed of glass or celluloid, and is illuminated from the back by means of a lamp 24. If an opaque chart is provided, it may be illumianted from the front.

The science of skiascopy involves the process of testing the refraction of the human eye by the objective method in contra-distinction to the method with the trial case or what is known as the subjective method, and contemplates examination of the eye in its normal state and under focal tension. In carrying out this test, the small mirror 12 is used to reflect light upon the retina of the patient's eye, which in turn causes the rays to pass back through the pupil of the patient's eye and then through the peep hole 11 into the examiner's eye where he is watching the reflex and shadow and applies spectacle lenses to remedy the refractive error.

It is desirable that the angle at which the test is made be as low as possible by directing the rays of light upon the patient's fovea centralis, and to this end the fixation chart which in the present case is the virtual image 23 seen in the mirror, should be as near to the reflecting skiascopic mirror 12 as possible, so that the line of the patient's vision and that of the examiner are separated by as small an angular distance as possible so that while the rays from the mirror 12 are directed close upon the fovea centralis, a portion of the macular is being reflected, which is very close to the fovea centralis.

The examiner conducts his test at a distance of from ten to forty inches. The patient directs his attention to the virtual chart 23 which is a few inches behind the examiner and uses as best he can, his muscular power to focus the virtual chart upon his retina. This differs from the system now in use which is to provide a chart in line with the skiascope, as the reflex is much brighter and the shadow more pronounced when the patient looks farther away and the conjugate foci of the retina are farther from the peep hole of the skiascopic mirror. The examiner aims to bring the conjugate foci of the retina from the virtual chart to the peep hole of the skiascope by the aid of spectacle lenses inserted into the trial frame, and to reduce the muscular strain as much as possible.

By changing the distance between the examiner and the patient the size of the image upon the retina is increased or diminished in geometric proportion. Thus, if the examiner conducts his examination at 40 inches from the patient the virtual image seen in the mirror is at 48 inches (if the reflection of the convex mirror has a divergence of 4 diopters or 10 inch focus). If the examiner approaches to 20 inches from the patient, the virtual chart will be $26\frac{2}{3}$ inches from the patient, as by approaching the convex mirror to the chart, the virtual image in the mirror will also approach the surface of the mirror, and the image of the chart focused on the retina of the patient's eye will occupy about four times as much area as when the examiner is at 40 inches. If the test is made at 13 inches the image on the retina will occupy about nine times as much area as when the test is conducted at 40 inches. The desire for clear vision is greatly developed in the human eye and as the image on the retina of the patient's eye is large and slightly out of focus, by bringing the conjugate focus of the retina to the peep hole of the skiascope while the patient gazes at the chart in the mirror, the focusing muscle will relax to the utmost.

In Figs. 7 to 14 I have illustrated a modified form of skiascope in which the chart to be reflected in the mirror is carried by and movable with the mirror. The law of reflecting mirrors is that the angle of reflection is equal to the angle of incidence. By having the chart attached to the mirror and by tilting the mirror, the angle of incidence does not change and the reflection will always be the same. The image in the mirror will always be within vision of the patient, the same only slowly moving from side to side or up and down as the mirror is tilted by the examiner. Referring to Figs. 7 and 8, this embodiment comprises a reflecting mirror 25 supported upon the disk 26, carrying the skiascopic mirror 27 and the examiner's corrective lens 28 similar to the mirror 12 and the corrective lens 15 of the form shown in Figs. 1 to 5. The disk 26 is supported by means of a ball and socket joint 29, the socket being formed of two half spherical sections $29^a$ and $29^b$, the section $29^a$ extending into an opening 30 in the disk 26, said portions being secured to the disk by means of screws 31 and 32 and adapted to be tightly clamped over the ball 29° provided at the end of the arm 33, secured to the casing of the mirror 25 by means of screws 34 and 35. At the back of the mirror there is provided a strap 36 which is engaged at the downwardly bent end 37 of a forwardly extending supporting arm 38, upon which there is adjustably mounted a slide 39 adapted to be secured in place by means of a set screw 40, the said slide 39 having secured thereto a channeled ring 41 in which there is mounted a chart 43. The arm 38 is preferably formed of bendable metal so that the same may be bent into any desired position to support the chart in the best possible relation with the reflecting mirror depending upon the position of the patient. The arm 38 is shown bent in Fig. 6. This chart is preferably transparent and it may be constructed of white glass, celluloid or the like, and is provided upon its side facing the mirror with reversed characters 44 adapted to be obversely reflected in the mirror. In Figs. 7 and 8, I have illustrated the mirror as concave while in Fig. 9 I have shown a convex mirror 45 and in Fig. 10 I have shown a plane mirror 46.

The test with the concave mirror is conducted in the following manner and as shown diagrammatically in Figs. 6 and 12. A lamp 47 is provided behind the patient, the rays of light therefrom being reflected by the skiascopic mirror 27 upon the pupil of the patient's eye as above described with reference to Fig. 1. The chart is reflected in the mirror and the patient directs his gaze on the virtual image 48 seen therein which is enlarged and is seen at a distance behind the skiascopic mirror. As the examiner tilts the mirror in conducting his examination, the virtual image only slowly moves with the tilting of the mirror. If the examiner conducts his examination at 40 inches from the patient and the chart is placed at 5 inches from the mirror, the virtual image seen in the mirror is at 50 inches distance if the concave mirror has a convergency of four diopters or ten in focus. If the examiner conducts his examination at 20 inches from the patient, the virtual image seen in the mirror is at 30 inches or 10 inches behind the surface of the mirror, the distance of the chart in front of the mirror and the dioptric strength of the mirror controlling this condition. If the examiner approaches to 15 inches of the patient, the virtual chart will be at 25 inches from the patient, and the image of the chart focused on the retina of the patient's eye will occupy about four times as much area as when the examiner is at 40 inches.

In the diagram shown in Fig. 13, the convex mirror 45 is used in which case the virtual image 49 is at a lesser distance behind the surface of the mirror than the chart is in front of the mirror. In Fig. 14, the diagram illustrates the use of the plane mirror shown in Fig. 10 and in which the virtual image 50 is seen at the same distance behind the surface of the mirror as the chart is in front of the mirror.

The chart is adjustable along the support 38 and this in connection with the adjustment afforded by the ball and socket joint and the bendability of the support 38, permits of any desired degree of adjustment depending upon the position of the patient, the arrangement of the room, and the direction of the light.

I have illustrated and described preferred and satisfactory embodiments of my invention but it is obvious that changes may be made therein within the spirit and scope thereof as defined in the appended claims.

I claim:

1. In combination, a skiascope, a spherical reflecting mirror supported in proximity thereto, a chart adapted to be reflected in said reflecting mirror, said reflecting mirror being disposed relatively to the head of the examiner viewing the patient's eye through the skiascope, so that the virtual image viewed therein is at a distance rearwardly of the examiner's eye at variance with the distance between the reflecting mirror and the patient's eye.

2. In combination, a skiascope, a spherical reflecting mirror supported in proximity thereto, and a chart adapted to be reflected in said reflecting mirror, the image of said chart in said reflecting mirror constituting an objective rearwardly of the examiner's eye to be viewed by the patient's eye at an angle to the line of vision of the examiner, said reflecting mirror adapted to have movement with said skiascope.

3. In combination, a skiascope, a spherical reflecting mirror supported in proximity thereto, a chart adapted to be reflected in said reflecting mirror, the image of said chart in said reflecting mirror constituting an objective rearwardly of the examiner's eye to be viewed by the patient's eye at an angle to the line of vision of the examiner, and an adjustable connection between said skiascope and said reflecting mirror adapted to adjust the angle of said reflecting mirror relatively to said skiascope, said reflecting mirror adapted to have movement with said skiascope.

4. In a skiascope, a supporting plate having a peep hole, a skiascope mirror secured at one side of said plate and having a peep hole in register with said peep hole of said supporting plate, a lens mounting secured at the other side of said plate, and a lens overlying said peep hole and supported in said mounting, adapted to correct the vision of the examiner.

5. In combination, a skiascope and a reflecting mirror supported in proximity thereto, a chart supported in proximity to said reflecting mirror and movable therewith, said reflecting mirror adapted to reflect the image of said chart.

6. In combination, a skiascope and a reflecting mirror supported in proximity thereto, a chart supported in proximity to said reflecting mirror, and movable therewith, said reflecting mirror adapted to reflect the image of said chart, said chart being adjustable toward or away from said reflecting mirror.

7. In combination, a skiascope and a reflecting mirror supported in proximity thereto, a chart supported in proximity to said reflecting mirror and movable therewith, said reflecting mirror adapted to reflect the image of said chart, said chart being adjustable as to height and angle relatively to said reflecting mirror.

8. In combination, a skiascope and a reflecting mirror supported in proximity thereto, a supporting arm carried by and movable with said reflecting mirror and projecting forwardly therefrom and a chart supported upon said supporting arm and adapted to be reflected in said reflecting mirror.

9. In combination, a skiascope and a spherical reflecting mirror supported in proximity thereto, a chart supported in proximity to said reflecting mirror and movable therewith, said reflecting mirror adapted to reflect the image of said chart.

10. In combination, a skiascope, a reflecting mirror supported in proximity thereto, and a chart supported in front of said reflecting mirror and movable therewith, said chart having reversed characters adapted to be reflected obversely in said reflecting mirror and constituting an objective to be viewed by the patient's eye at an angle to the line of vision of the examiner.

In testimony that I claim the foregoing as my invention, I have signed my name hereunder.

NATHAN A. SHIGON.